2,995,459
METHOD FOR COLORING NACREOUS MATERIALS AND PRODUCTS AND COMPOSITIONS PROVIDED THEREBY
Saul Soloway, New Rochelle, N.Y., assignor to Faberge, Inc., a corporation of New York
No Drawing. Filed Nov. 26, 1957, Ser. No. 698,920
15 Claims. (Cl. 106—290)

This invention relates to a method for coloring nacreous materials without destroying their characteristic pearly appearance and includes colored nacreous materials produced according to the method of the invention, and compositions containing these products.

Nacreous materials are used for decorative purposes, in plastics, in surface coatings, including paints, lacquers and fingernail polishes, and in the manufacture of leather wearing apparel, among other uses. The terms "nacreous" and "pearlescent" are employed synonymously herein to designate all types of natural or synthetic substances having a pearly appearance. Nacreous substances have generally been used heretofore in their natural coloring, the best of such materials being white, although there has long been a demand for colored pearlescent materials for a variety of different uses. Previous attempts to supply this demand have met with failure due to the difficulty of producing color-stable nacreous substances without destroying their characteristic pearly appearance.

Adsorption of dyes on the surface of nacreous materials by treatment of these substances with a solution or suspension of dye has proven unsatisfactory since adsorbed dyes are readily leached from the nacreous materials when exposed to fresh solvent. For example, a process has been suggested in which synthetic nacreous crystals are formed in a liquid containing certain protein hydrolysates, separated from the mother liquor by filtration and stained with methyl blue. If the resulting colored crystals are too highly stained they may be washed with cold water to remove some of the protein hydrolysates and the excess methyl blue.

It has also been attempted to color nacreous materials by incorporating coloring matter in the body of synthetic crystals during their formation. This procedure, however, places definite limitations upon the basic character of the crystals and the coloring thereof. Furthermore, it is not adaptable to the coloring of natural pearlescent materials or the majority of synthetic pearlescent materials. A method of general utility for coloring all types of natural and synthetic pearlescent materials, without destroying their pearly appearance, has not been previously available.

It is therefore a primary object of the present invention to provide a means for coloring either preformed synthetic or natural pearlescent materials to impart thereto any desired color without destroying the characteristic pearly luster of these substances.

It is a further object of the invention to provide colored pearlescent materials suitable for use in the manufacture of surface coatings, particularly fingernail polish, colored plastics, and other types of decorative manufactured articles.

An additional object of the invention has been to provide a method for producing colored pearlescent materials which are color-stable in the presence of common solvents and surface coating vehicles.

It is a further object of the invention to provide a method for the deposition of coloring matter on the surface of nacreous crystals without substantially destroying the characteristic geometry of such crystals.

These and other objects of the invention, which will be apparent from the following detailed description, are attained by the controlled deposition of freshly precipitated coloring matter directly onto preformed nacreous crystals suspended in a liquid medium.

The method of the present invention comprises preparing a suspension of natural or synthetic pearlescent flakes or crystals in a liquid medium and mixing therein two dilute solutions of chemical reagents capable of forming a colored precipitate. By this procedure the coloring matter to be deposited on the nacreous crystals is freshly precipitated in the presence of the suspended crystals. The nacreous crystals function as a catalyst for the precipitation of the applied coloring matter. The suspension of nacreous crystals should be stirred constantly during the formation and depositon of the colored precipitate. The two reagent solutions may be added to the suspension simultaneously either continuously or in small increments. Other methods have also been tried and found successful. For example, it is is convenient to add the stoichiometric or an excess of one of the reagents to the suspension of pearlescent material to be colored and then to add a second reagent, in the form of a dilute solution, to the mixture slowly, either continuously or in successive small portions or increments. The rate of mixture of the reagent solutions, or in the latter method, the rate of addition of the second reagent solution to the first solution containing the suspended nacreous material, is important. This rate should be controlled so that substantially all of the colored precipitate formed by the mixture of the two reacting solutions is deposited substantially immediately upon the individual nacreous crystals which serve as nuclei for the precitate. The formation of bulk precipitate in the reaction mixture out of contact with the suspended nacreous material is to be avoided.

Natural pearl essence was formerly obtained from bleak and marketed in the form of an aqueous suspension known as essence d'orient but is now derived primarily from the scales of other cyprinoid and clupeoid fishes, including herring and shad. These materials are presently commercially available as an 11% suspension of nacreous material in butyl acetate. Certain other naturally occurring substances not derived from fishes also have a pearlescent appearance. These substances include cholesterol and its esters, talc, brucite, a native magnesium hydroxide, and stilbite, a native hydrated sodium, calcium, aluminum silicate or the zeolite group which occurs as pearly white prisms. Synthetic pearlescent substances generally consist of inorganic materials, including finely divided flaky metals such as aluminum, and various heavy metal salts, including mercurous chloride, bismuth oxychloride and lead subcarbonate. The method of the invention can be employed to color any of the above substances all of which are referred to herein as nacreous or pearlescent materials.

In the method of the invention the pearlescent materials can be dispersed or suspended in aqueous or nonaqueous liquid media. Suitable nonaqueous media include the lower aliphatic alcohols and various oxygenated or chlorinated organic solvents which are, in general, preferred to aqueous media. Ethyl acetate is a particularly suitable suspension medium. Certain suspension media, e.g., methanol, have a tendency to cause pearlescent crystals to coalesce or clump unless the pearlescent material is pretreated with a stabilizing agent such as nitrocellulose.

A wide variety of coloring agents may be used in the invention although it is necessary that these materials be substantially insoluble in the suspension medium or reaction mixture. Generally, it is preferred that the coloring agents be sufficiently insoluble to permit the colored nacreous crystals to be washed with the solvent in which the precipitation was carried out or any solvent with which the product will come in contact in use. The precipitated materials used to impart color to nacreous crystals according to the new method may conveniently be grouped under the following headings:

(1) Insoluble metal compounds;
(2) Free metals; and
(3) Insoluble dyes.

The chemical reagents employed in the invention are chosen to produce one of these types of colored precipitates when mixed in the suspension medium.

Among the many insoluble metallic compounds which may be employed as coloring agents, particularly useful compounds include the sulfides, molybdates, tungstates, xanthates and dithiazones of the di- and tri-valent metals, especially cadmium, manganese, nickel, cobalt, iron and antimony. Various other specific compounds such as nickel dimethylglyoxime, and aurous thioacetamide are also particularly useful. Solutions of reagents capable of forming mixtures of these salts may also be employed to obtain desired colors. For example, co-precipitates of antimony sulfide and ferrous sulfide or mixtures of this co-precipitate with tin sulfides may be used to impart desirable golden colors to pearlescent materials.

When free metals are used as the coloring matter, they may conveniently be applied to the individual crystals of the nacreous material to be colored by dissolving a soluble compound of the metal in the suspension medium and releasing the free metal from solution by reduction so that it deposits or plates on the individual nacreous crystals. Although any metal capable of forming a colored deposit on nacreous crystals when reduced may be used in the invention, it is preferred to employ the metals of group 1b of the periodic table, i.e., copper, silver and gold, and the platinum group metals, particularly platinum, iridium, palladium, rhodium, and ruthenium. Gold is particularly preferred.

Dyes suitable for use in coloring nacreous crystals according to the invention include anionic, cationic and non-ionic types, soluble in a suspension medium. The cationic types may be precipitated as their phosphotungstates or phosphomolybdates or as other complexes with heteropoly acids. The anionic types may be precipitated as their heavy metal salts. Non-ionic dyes may be deposited as molecular complexes by the addition of dye and a suitable mordant according to the method of the invention.

The method of precipitating coloring matter in the presence of suspended nacreous crystals is substantially the same whether insoluble metal compounds, free metals, or insoluble dyes are employed as the coloring matter. The primary consideration is that the coloring matter, whatever form it may take, be freshly precipitated in the presence of suspended nacreous crystals in such amounts and at such a rate that substantially all of the coloring matter precipitated is deposited as it is formed, directly on the surfaces of the suspended nacreous crystals. In other words, the method of the invention comprises the controlled in situ precipitation of a colored substance directly onto the surfaces of suspended nacreous crystals.

The pearly luster of nacreous materials is generally attributed to the characteristic geometry of the individual crystals of such substances. In the method of the present invention this characteristic geometry is preserved in the colored product by the slow deposition of particles of coloring matter of substantially colloidal dimensions on the surface of the seed crystals. This result is assured by causing the precipitation of coloring matter to take place at such a rate that substantially all of the colored precipitate is deposited on the seed crystals immediately, before the individual particles of the precipitate grow beyond colloidal size or thereabouts. However, although the particles of colored precipitate deposit on the seed crystals immediately on precipitation, the rate of formation of the coating on individual seed crystals is relatively slow due to the limitation of the rate at which the precipitate is formed. The suspended nacreous crystals to be colored should not be exposed to large amounts of suspended precipitated coloring matter at any one time since this permits relatively large amounts of coloring matter to deposit on the individual crystals at substantially the same time, which results in the formation of a randomly deposited unoriented coating which destroys the luster of the nacreous crystals.

The concentrations of the pearlescent substances in the suspensions and the reagents in the solutions, employed in the invention may vary over wide limits but are somewhat critical for best results. It is preferred to employ suspensions of nacreous crystals containing about 1% to 5% by weight of the nacreous material although in some instances up to about 10% or more of suspended crystals may be employed. Concentrations of less than 1% may also be used, although it is seldom necessary or economic. The concentration of the reagent solutions may vary from about 0.1% to about 10% or more based on the weight of the actual reagent, i.e., the chemical fragment entering into the reaction which forms the precipitate, although concentrations of about 1% to 5% are generally most satisfactory. The preferred concentrations in any particular case will, of course, depend upon the chemistry of the particular reagents employed and particularly on the solubility, in the mixture being stirred, of the coloring matter to be precipitated.

The method of the invention may be carried out over a wide range of acidity in both aqueous and non-aqueous media, this factor being limited primarily by the stability of the nacreous crystals and the particular coloring matter employed. In general, it is preferred to operate at pH's ranging from that of a dilute aqueous solution of acetic acid to that of dilute aqueous ammonia, or stated differently, from about pH 2 to 10. This is particularly true with natural pearl essences which tend to be attacked at pH's outside of this range. In general, it is also preferred to avoid the more acid and basic values of the above pH range and, therefore, when the reagents used to form the coloring matter are such as to require it, a buffer or pH stabilizing agent, can be employed with advantage. It has been observed that the use of such a "buffer" frequently enhances the quality of the product obtained. The above comments with respect to acidity also apply generally to nonaqueous organic media where it is desirable to avoid highly protonated solvents or suspension media.

The method of the invention then, generally comprises the steps of forming a suspension of a nacreous material in an aqueous or nonaqueous liquid medium containing from about 1 to about 5% by weight of nacreous crystals, slowly mixing in the suspension either continuously or incrementally, two reagent solutions, each containing about 0.1 to 5% by weight of reagent, which are adapted to produce a colored precipitate when mixed, or in the preferred method incorporating one of the reagent solutions in the suspension initially and adding the second reagent solution to the reaction mixture slowly in small increments, for example, dropwise or continuously, and controlling the rate of precipitation to allow the freshly precipitated coloring matter to orient itself on the suspended nacreous crystals without destroying their pearly luster.

The entire mixture with its suspension of colored nacreous crystals may then be heated to a moderately elevated temperature if desired. Digestion may also be carried out if desired at room or elevated temperatures. The suspended crystals may then be removed from the reaction medium by filtration or centrifugation and washed with a solvent to remove excess reagents. This product may then be washed again with other solvents to adapt it for use in particular applications. This procedure results in the formation of a color-stable nacreous substance of any desired color which has a highly lustrous pearly appearance. The colored nacreous crystals produced in this manner are adapted for use in conventional solvent media employed in the preparation of lacquers, paints, and other surface coatings and for incorporation in all types of plastic materials.

The invention will be illustrated in greater detail by the following specific examples:

INSOLUBLE METAL COMPOUNDS

*Example 1.—Aurous thioacetamide on natural pearl essence*

A commercially available natural pearl essence consisting of a suspension of guanine, derived from fish scales, in butyl acetate containing 11% of pearl essence by weight was obtained. This suspension (10 cc.) was washed with ethyl acetate and centrifuged. The centrifuged crystals were then suspended in ethyl acetate (10 cc.) and stirred into a solution of thioacetamide (1.13 grams) in ethyl acetate (65 cc.). A solution of chlorauricacid tri-hydrate (1.1 grams) in ethyl acetate (40 cc.) was added dropwise with stirring to the suspension of pearl essence containing the dissolved thioacetamide. A precipitate, presumably aurous thioacetamide, which formed with the addition of each drop of the gold reagent solution, deposited on the suspended crystals of pearl essence. The rate of dropwise addition of the 40 cc.-solution was regulated so that substantially all of the precipitate deposited on the suspended pearl essence as it was formed. This required dropwise addition over a period of about 30 minutes. Pyridine (25 cc.) was added to the stirred suspension and the reaction mixture was heated on a water bath at 90° C. for about 10 minutes. The reaction mixture was centrifuged, the precipitate washed with methanol until odorless and then again with ethyl acetate. The washed product was then suspended in a conventional finger-nail lacquer. The resulting product which had an attractive greenish gold color, exhibited the characteristic pearly luster of the original pearl essence.

*Example 2.—Cadmium sulfide on natural pearl essence*

A quantity of commercial natural pearl essence consisting of a suspension in butyl acetate of guanine derived from fish scales (11% guanine based on the weight of the suspension) was centrifuged. The resulting precipitate was washed with ethyl acetate and a new suspension prepared containing 5 grams of centrifuged crystals per 25 cc. of ethyl acetate. This product which will be referred to herein as "guanine suspension A" was employed in this and subsequent examples where indicated.

Guanine suspension A (0.5 cc.) was added to a solution of cadmium iodide in ethyl alcohol (5 cc. of a 1% solution). A saturated solution of hydrogen sulfide in ethyl alcohol (10 cc.) was then added to the reaction mixture dropwise with stirring. The resulting yellow precipitate of cadmium sulfide deposited on the suspended crystals of natural pearl essence. When the suspension was centrifuged and the precipitate washed with methanol, the resulting product had a yellow color and a pearly luster.

This procedure was repeated substituting a saturated solution of cadmium iodide in ethyl acetate (about 2% cadmium iodide by weight) for the alcoholic solution used above. A satisfactory yellow product having a pearly luster was obtained.

Further experiments were carried out, according to the general procedure of this example in which water was added to the organic solvent medium and the pH of the reaction mixture varied by the addition of acid and base. All of the products obtained in these modifications were darker yellow than those described above but the luster of the pearl essence was preserved in every case. The presence of water was observed to render the yellow products more intensely orange and less green. The addition of ammonia also affected product color, which ranged from light yellow to orange as more ammonia was added.

Deposition of cadmium sulfide on a gold-coated product similar to that of Example 1 according to the above procedure produced a pearlescent gray-green product.

*Example 3.—Manganese sulfide on natural pearl essence*

A 1% solution of potassium hydroxide in methanol was saturated with hydrogen sulfide. The resulting hydrogen sulfide reagent (10 cc.), which will be referred to herein as solution B, was added dropwise with stirring to a suspension of guanine suspension A (0.5 cc.) in a methanolic solution of manganese chloride (5 cc. of a 1% solution). A flesh colored manganese sulfide coating was deposited on the suspended nacreous crystals which retained their pearlescent appearance. When a coating of cadmium sulfide was applied over the manganese sulfide coating by the procedure of Example 2 a green pearlescent product was obtained.

*Example 4.—Antimony sulfide on natural pearl essence*

The procedure of Examples 2 and 3 was repeated substituting a methanolic solution of antimony chloride (5 cc. of 0.5% solution) for the guanine suspension media previously employed. A bright orange coating having a pearly luster was formed on the suspended crystals.

*Example 5.—Iron sulfide on natural pearl essence*

The procedure of Example 4 was repeated employing a methanolic solution of ferric chloride (5 cc. of a 0.5% solution) as a suspension medium for guanine suspension A (0.5 cc.). A gray-black coating having a pearlescent appearance was deposited on the suspended nacreous crystals.

*Example 6.—Mixed antimony and iron sulfides on natural pearl essence*

Hydrogen sulfide solution B (10 cc.) was added dropwise to guanine suspension A (0.5 cc.) suspended in a solution made up of 1 drop of methanolic ferric chloride solution (0.5%) and 40 drops of methanolic antimony chloride solution (0.5%). A metallic gold-colored coating was produced on the suspended nacreous crystals which retained their pearlescent appearance.

*Example 7.—Mixed antimony, iron and tin sulfides on natural pearl essence*

Hydrogen sulfide solution B (10 cc.) was added dropwise with stirring to guanine suspension A (0.5 cc.) suspended in a methanolic solution made up of 1 drop of ferric chloride solution, 25 drops of antimony chloride solution and 100 drops of stannic chloride solution (all 0.5% solutions in methanol). The suspended natural guanine crystals were colored an extremely golden color and had a pearly luster.

*Example 8.—Mixed tin and cadmium sulfides on natural pearl essence*

Hydrogen sulfide reagent solution C was prepared by dissolving potassium sulfide (0.5 gram) in methanol (100 cc.), heating the solution on a steam bath, cooling and filtering and then bubbling hydrogen sulfide through the solution for about 15 minutes. A series of experiments was conducted in which portions of hydrogen sulfide solution C (10 cc. each) were added dropwise with stirring to portions of guanine suspension A (0.5 cc. each) suspended in varying amounts of a methanolic solution of stannous chloride and cadmium iodide (1% of each). The suspended nacreous guanine crystals were colored yellow and had a pearlescent appearance in every case.

*Example 9.—Mixed tin and iron sulfides on natural pearl essence*

Hydrogen sulfide solution C (10 cc.) was added dropwise with stirring to guanine suspension A (0.5 cc.) suspended in a solution containing stannic chloride (9 cc. of 0.5% methanolic solution), ferric chloride (3 drops of 0.5% methanolic solution), and stannous chloride (100 drops of 0.5% methanolic solution) in methanol (50 cc.). The resulting coated product had a golden color and was pearlescent in appearance.

*Example 10.—Nickel dimethylglyoxime on natural pearl essence*

Dimethylglyoxime (50 cc. of a 1% solution in methanol) was added dropwise with stirring to a solution of nickel chloride (130 cc. of a 1% methanolic solution of nickel chloride hexahydrate) which had commercial pearl essence (2 grams of 11% suspension of guanine in butyl acetate) suspended therein. A pink coating was deposited on the suspended guanine crystals which retained their pearlescent appearance.

*Example 11.—Palladium dimethylglyoxime on natural pearl essence*

A palladium reagent solution was prepared by dissolving palladium chloride (3 grams) in a solution containing concentrated hydrochloric acid (15 cc.), water (10 cc.) and methanol (120 cc.). Nacreous guanine (10 grams), obtained by centrifuging a commercial 11% suspension of guanine in butyl acetate, was suspended in methanol (50 cc.) and a methanolic solution of dimethylglyoxime (75 cc. of a 1% solution). 2-amino-2-methyl-1-propanol (1 gram) in methanol (20 cc.) was added to the suspension. A portion of the palladium reagent solution (10 cc.) was diluted with methanol (40 cc.) and added to the suspension dropwise with stirring over a period of 20 minutes. A bright yellow coating formed on the suspended crystals which retained their pearlescent appearance.

*Example 12.—Palladium furil dioxime on natural pearl essence*

Nacreous guanine (10 grams), obtained by centrifuging a commercial 11% suspension in butyl acetate, was suspended in methanol (50 cc.) and a methanolic solution of furil dioxime (150 cc. of a 1% solution). 2-amino-2-methyl-1-propanol (1 gram) in methanol (15 cc.) was added to the guanine suspension. A portion (10 cc.) of the palladium chloride reagent solution of Example 11 was diluted with methanol (40 cc.) and added dropwise with stirring to the guanine suspension over a period of 20 minutes. The suspended crystals, which were colored bright orange by the precipitate deposited on them, exhibited a pearly luster.

*Example 13.—Cadmium sulfide on nacreous lead subcarbonate*

Examples 1–12 above illustrate the application of the method of the invention to the coloring of natural pearl essence. The present and some of the following examples illustrate the utility of the invention in coloring synthetic nacreous materials as opposed to natural nacreous materials derived from marine sources. A methanolic solution of cadmium iodide (10 drops of a 1% solution) was diluted with ethyl acetate (10 cc.) and used as a suspension medium for commercial nacreous lead subcarbonate (2 drops of an 11% suspension in ethyl acetate). Saturated methanolic hydrogen sulfide solution (2 cc.) was added dropwise with stirring to the suspension of nacreous lead subcarbonate in ethyl acetate and methanolic cadmium iodide. An orange precipitate formed on the suspended crystals which were washed with methanol and again with ethyl acetate by centrifugation. The orange product had a pearly luster.

*Example 14.—Nickel dimethylglyoxime on nacreous lead subcarbonate*

Commercial nacreous lead subcarbonate (2 drops of an 11% suspension in ethyl acetate) was suspended in ethyl acetate (10 cc.) to which a methanolic solution of nickel chloride (10 drops of a 1% solution) had been added. A methanolic solution of dimethylglyoxime (5 cc. of a 1% solution) was added to the suspension dropwise with stirring. A red coating was produced on the suspended crystals which were washed with ethyl acetate and suspended in linseed oil. The resulting product was red in color and had a pearlescent appearance.

*Example 15.—Antimony sulfide on nacreous bismuth oxychloride*

Commercial nacreous bismuth oxychloride (2 drops of an 11% suspension in methanol) was suspended in a methanolic solution of antimony chloride (10 drops of a 0.5% solution). Methanolic hydrogen sulfide reagent solution (2 cc. of solution C of Example 8) was added to the suspension dropwise with stirring. An orange precipitate formed on the suspended crystals of nacreous bismuth oxychloride. The resulting colored product had a pearlescent appearance.

*Example 16.—Nickel dimethylglyoxime on nacreous bismuth oxychloride*

Commercial nacreous bismuth oxychloride (2 drops of an 11% suspension in methanol) was suspended in a methanolic solution of nickel chloride (10 drops of an 11% solution). A methanolic solution of dimethylglyoxime (2 cc. of a 1% solution) was added to the suspension dropwise with stirring. A pink-red coating was deposited on the suspended crystals of nacreous bismuth oxychloride producing a colored pearlescent product.

FREE METALS

*Example 17.—Silver on natural pearl essence*

Guanine suspension A (5 cc. of the suspension in ethyl acetate of natural guanine derived from fish scales, described in Example 2) was suspended in a methanolic solution of silver nitrate (obtained by dissolving 20 cc. of 0.5% methanolic silver nitrate in 100 cc. of additional methanol). This suspension was adjusted to about pH 8 (as judged by indicators) by the addition of methanolic ammonia. A hydroxylamine reagent solution was prepared by dissolving hydroxylamine hydrochloride (6.9 grams) and potassium hydroxide (5.6 grams) in separate portions of methanol (600 cc. each), mixing the solutions and filtering off the salt. This procedure produced a reagent solution containing about 3.3 grams of hydroxylamine in about 1200 cc. of methanol. A portion of the hydroxylamine reagent solution (10 cc.) was added dropwise with stirring to the suspension of natural pearl essence in methanolic silver nitrate. A metallic silver coating was deposited on the suspended nacreous crystals to produce a pearlescent silver-colored product.

*Example 18.—Gold on natural pearl essence*

Commercial natural pearl essence (18 grams of an 11% suspension of natural guanine in butyl acetate) was suspended in a methanolic solution of chlorauric acid (46 cc. of a 0.07% methanolic solution of chlorauric acid and 100 cc. of additional methanol). Methanolic sodium hydroxide (1% solution) was added to the suspension to adjust the pH to about 7.5 (as judged by indicators). A portion (10 cc.) of the hydroxylamine reagent solution described in Example 17 was added to the suspension dropwise with stirring. Metallic gold was deposited on the surfaces of the suspended nacreous crystals to produce a silvery-gray colored product having a pearlescent appearance.

*Example 19.—Gold on nacreous lead subcarbonate*

Commercial nacreous lead subcarbonate (2 drops of an 11% suspension in ethyl acetate) was suspended in an ethyl acetate solution of chlorauric acid (10 drops of a 1% solution). A solution of hydroxylamine (5 cc. of a 0.5% solution in n-propyl alcohol) was added dropwise with stirring to the suspension of nacreous crystals. Metallic gold deposited on the suspended crystals to produce a silvery-gray colored product having a pearlescent appearance.

*Example 20.—Gold on nacreous bismuth oxychloride*

Commercial nacreous bismuth oxychloride (2 drops of an 11% suspension in methanol) was suspended in an ethyl acetate solution of chlorauric acid (10 drops of a 1% solution) and methanol (10 cc.). Hydroxylamine reagent (2 cc. of a 0.5% solution in n-propyl alcohol) was added to the suspension dropwise with stirring. A gray pearlescent deposit was formed on the suspended crystals to yield a colored pearlescent product.

INSOLUBLE DYES

*Example 21.—Phosphomolybdate-dye complexes on natural pearl essence*

A saturated solution of the dye neutral red (dimethyldiaminotoluphenazine hydrochloride) in ethyl acetate was prepared and a portion (10 cc.) employed to suspend a quantity of commercial natural pearl essence (10 cc. of an 11% suspension of guanine derived from fish scales in butyl acetate diluted with 100 cc. of ethyl acetate). A saturated solution (10 cc.) of phosphomolybdic acid in ethyl acetate was added dropwise with stirring to the suspension of nacreous guanine. The dissolved dye was precipitated and deposited on the surfaces of the guanine crystals. The resulting colored crystals were washed with ethyl acetate by centrifugation until the centrifugate was practically colorless and then suspended in a lacquer for application to the fingernails as a sealer. The colored product had a pearlescent luster.

The procedure outlined above was duplicated substituting methyl violet, crystal violet and atabrine dihydrochloride, respectively for the neutral red dye. Correspondingly colored nacreous crystals having a pearlescent appearance were obtained in each case.

*Example 22.—F.D.C. Green No. 1-phosphomolybdate complex on nacerous lead subcarbonate*

Commercial nacreous lead subcarbonate (2 drops of an 11% suspension in ethyl acetate) was suspended in methanolic phosphomolybdic acid (10 drops of a 1% solution). A methanolic solution of a soluble dye, Food and Drug Commission Green No. 1 (5 cc. of 1% solution), was diluted with ethyl acetate (15 cc.) and added dropwise with stirring to the suspension of nacreous lead subcarbonate. A green precipitate was deposited on the suspended crystals to produce a colored pearlescent product.

*Example 23.—F.D.C. Green No. 1-phosphomolybdate complex on nacreous bismuth oxychloride*

Commercial nacreous bismuth oxychloride (2 drops of an 11% suspension in methanol) was suspended in methanolic phosphomolybdic acid (10 drops of a 1% solution). A methanolic solution of soluble dye, Food and Drug Commission Green No. 1 (5 cc. of a 1% solution), was added to the suspension dropwise with stirring. The suspended crystals were colored blue and were pearlescent in appearance.

COMPOSITIONS CONTAINING COLORED NACREOUS MATERIALS

*Example 24.—Fingernail enamel composition*

A lacquer having the following composition was prepared:

| | Percent |
|---|---|
| Nitrocellulose | 10 |
| Dammar gum | 10 |
| Dibutyl phthalate | 5 |
| Isopropanol | 5 |
| Ethyl acetate | 20 |
| Butyl acetate | 15 |
| Toluene | 35 |

Finely divided nacreous material in suspension was dispersed in the lacquer in an amount sufficient to provide about 1% of solid nacreous material in the total composition. About 60% of the added nacreous solids consisted of the gold-colored product of Example 1, the remaining 40% being uncolored natural pearl essence. The resulting product was a highly pearlescent gold-colored fingernail enamel.

A wide variety of other decorative colored pearlescent compositions may be manufactured employing the products of the invention. For example, other pearlescent fingernail lacquers of any desired color are produced by incorporating up to about 10% by weight of the colored nacreous materials of the invention in a standard fingernail lacquer which may be either clear or colored as desired. Suitable lacquers for this purpose include the readily available solutions of nitrocellulose in butyl acetate, which may also contain dyes or pigments if desired. The exact amount of colored pearlescent material employed in this and other applications is, of course, determined by the desired esthetic effect. Colored pearlescent compositions suitable for artists' use are obtained by incorporating about 1 to 10% of the colored nacreous substance in a drying oil, e.g. tung, linseed or oiticica oil. The colored pearlescent substances may also be incorporated in plastics, 1 to 10% by weight again being a suitable proportion for most purposes. This may be accomplished, for example, by mixing the desired amount of colored nacreous material in a monomer such as styrene, methyl methacrylate or the like and then polymerizing the mixture by means of benzoyl peroxide or other suitable catalysts according to conventional procedures to produce a thermoplastic product. Colored pearlescent thermosetting plastics may be produced in like manner by incorporating a cross linking agent such as divinyl benzene in the reaction mixture prior to polymerization.

Commercially available pearl essence preparations, both natural and synthetic, usually contain a stabilizing agent, often nitrocellulose, to prevent clumping of the suspended nacreous crystals. It is frequently necessary, however, when working with unstabilized nacreous substances to pretreat the crystals prior to coloring them according to the present invention. This is particularly the case when methanol is employed, as the suspension medium, a solvent for a reagent or as a wash liquor for the colored crystals. It has been observed, however, that nacreous bismuth oxychloride does not clump as a rule even in the presence of methanol. It has been found that the clumping of nacreous guanine crystals can be prevented by stabilizing suspensions of such crystals with minor amounts of various substances in addition to nitrocellulose, such as ethyl cellulose and cellulose esters. For example, an n-butyl acetate suspension of nacreous guanine may be satisfactorily stabilized by the incorporation of less than 0.5% by weight of any of the stabilizing agents named above.

All amounts of reagents, nacreous material and the like given herein are expressed as percent by weight unless otherwise indicated.

The terms and expressions which we have employed are used as terms of description and not of limitation, and we have no intention, in the use of such terms and expressions, of excluding any equivalents of the features described but recognize that various modifications are possible within the scope of the invention claimed.

What is claimed is:

1. A method for coloring finely divided nacreous material suspended in a liquid medium which comprises precipitating coloring matter in situ on the individual particles of said nacreous material by admixing with agitation a solution of a precipitating agent to said suspension at a rate of addition slow enough so that substantially all of the coloring matter is precipitated directly on the individual nacreous particles without destroying the characteristic geometry of said particles, with said rate of admixture being less than will produce significant amounts of precipitated coloring matter out of contact with the suspended nacreous material.

2. A method for coloring finely divided nacreous material suspended in a liquid medium which comprises precipitating coloring matter in situ on the individual particles of said nacreous material by admixing together with agitation of the liquid suspension medium, dilute solutions of chemical reagents capable of forming a colored precipitate when so mixed, at a rate of addition slow enough so that the coloring matter is precipitated directly on the individual nacreous particles without destroying the characteristic geometry of said particles, with said rate of admixture being less than will produce significant amounts of precipitated coloring matter out of contact with the suspended nacreous material.

3. A method for coloring finely divided nacreous material suspended in a liquid medium which comprises the addition of a first chemical reagent to said medium to form therein a dilute solution of said reagent, precipitating coloring matter in situ on the individual particles of nacreous material suspended in said medium containing said first chemical reagent by the addition thereto of a dilute solution of a second chemical reagent capable of forming a colored precipitate when mixed with said first reagent in solution with agitation, with said dilute solution of said second chemical reagent being admixed to said medium at a rate slow enough so that substantially all of the coloring matter precipitated thereby is precipitated directly on the individual nacreous particles without destroying their characteristic geometry, with said rate of admixture being less than will produce significant amounts of precipitated coloring matter out of contact with the suspended nacreous material.

4. The method of claim 3 in which the solution of the second chemical reagent is added incrementally to the liquid medium containing the first reagent.

5. The method of claim 3 in which the solution of the second chemical reagent is added continuously to the liquid medium containing the first reagent.

6. A method for imparting a golden color to finely divided nacreous material suspended in a liquid medium which comprises precipitating aurous thioacetamide in situ on the individual particles of said nacreous material by mixing, in the liquid suspension medium, dilute solutions of chlorauric acid and thioacetamide capable of forming a precipitate of aurous thioacetamide when so mixed, and controlling the rate of mixing of said solutions so that substantially all of the aurous thioacetamide precipitated is deposited on the individual nacreous particles to produce a pearlescent gold-colored product without precipitating substantial amounts of coloring matter out of contact with said nacreous material.

7. A method for imparting a silvery-gray color to finely divided nacreous material suspended in a liquid medium which comprises precipitating metallic gold in situ on the individual particles of said nacreous material by mixing, in the liquid suspension medium, a dilute solution of chlorauric acid and a dilute solution of hydroxylamine capable of reducing said chlorauric acid to precipitate metallic gold, and controlling the rate of mixing of said solutions so that substantially all of the metallic gold precipitated is deposited on the individual nacreous particles to produce a pearlescent silvery-gray product without precipitating substantial amounts of coloring matter out of contact with said nacreous material.

8. A colored pearlescent particulate material, color-stable in the presence of common solvents, which consists essentially of a particulate nacreous base and applied coloring matter, said coloring matter being precipitated on the individual particles of said nacreous base by admixing with agitation, to a suspension of said nacreous base containing dissolved therein a colored substance capable of being precipitated from solution, a precipitating agent at a rate slow enough so that substantially all of the precipitated coloring matter is precipitated directly on the individual nacreous particles so as to preserve the characteristic geometry of said particles without precipitating substantial amounts of coloring matter out of contact with said nacreous base.

9. A gold-colored pearlescent particulate material, color-stable in the precence of common solvents, which consists essentially of a particulate nacreous base and applied aurous thioacetamide coloring matter, said aurous thioacetamide being precipitated on the individual particles of said nacreous base so as to preserve the characteristic geometry and pearlescent appearance of said particles without precipitating substantial amounts of coloring matter out of contact with said nacreous base.

10. A silvery-gray-colored pearlescent particulate material, color stable in the presence of common solvents, which consists essentially of a particulate nacreous base and applied metallic gold coloring matter, said metallic gold being precipitated on the individual particles of said nacreous base so as to preserve the characteristic geometry and pearlescent appearance of said particles without precipitating substantial amounts of coloring matter out of contact with said nacreous base.

11. A surface coating composition consisting essentially of a film-forming vehicle having dispersed therein up to about 10%, based on the weight of the composition, of a particulate, colored, color-stable, pearlescent material consisting essentially of a particulate nacreous base having coloring matter precipitated on the individual particles thereof by admixing with agitation, to a suspension of said nacreous base containing dissolved therein a colored substance capable of being precipitated from solution, a precipitating agent at a rate slow enough so that substantially all of the precipitated coloring matter is precipitated directly on the individual nacreous particles so as to preserve the characteristic geometry of said particles without precipitating substantial amounts of coloring matter out of contact with said nacreous base.

12. A lacquer containing up to about 10% by weight of a colored pearlescent particulate material consisting essentially of a particulate nacreous base and applied coloring matter, said coloring matter being precipitated on the individual particles of said nacreous base so as to preserve the characteristic geometry and pearlescent appearance of said particles without precipitating substantial amounts of coloring matter out of contact with said nacreous base.

13. A nitrocellulose lacquer containing up to about 10% by weight of a colored pearlescent particulate material consisting essential of a particulate nacreous base and applied coloring matter, said coloring matter being precipitated on the individual particles of said nacreous base so as to preserve the characteristic geometry and pearlescent appearance of said particles without precipitating substantial amounts of coloring matter out of contact with said nacreous base.

14. A fingernail lacquer containing about 1 to 10% by weight of a gold-colored pearlescent particulate material consisting essentially of a particulate nacreous base and applied aurous thioacetamide coloring matter, said coloring matter being precipitated on the individual particles of said nacreous base so as to preserve the characteristic geometry and pearlescent appearance of said particles without precipitating substantial amounts of coloring matter out of contact with said nacreous base.

15. A fingernail lacquer containing about 1 to 10% by weight of a silvery-gray-colored pearlescent particulate material consisting essentially of a particulate nacreous base and applied metallic gold coloring matter, said coloring matter being precipitated on the individual particles of said nacreous base so as to preserve the characteristic geometry and pearlescent appearance of said particles without precipitating substantial amounts of coloring matter out of contact with said nacreous base.

References Cited in the file of this patent

UNITED STATES PATENTS

| | | |
|---|---|---|
| 1,276,681 | Baumgardner | Aug. 27, 1918 |
| 1,289,873 | Marakami | Dec. 31, 1918 |
| 2,018,388 | Tosterud | Oct. 22, 1935 |
| 2,097,269 | Brossman | Oct. 26, 1937 |
| 2,555,224 | Decker | May 29, 1951 |